United States Patent [19]

Möckli

[11] 4,385,900
[45] May 31, 1983

[54] TRANSFER PRINTING SUPPORTS AND DYES FOR THEIR MANUFACTURE: FLUOROALKOXY ANTHRAQUINONE DYE

[75] Inventor: Peter Möckli, Basel, Switzerland

[73] Assignee: Ciba-Geigy AG, Basel, Switzerland

[21] Appl. No.: 311,332

[22] Filed: Oct. 14, 1981

[30] Foreign Application Priority Data

Oct. 17, 1980 [CH] Switzerland .......................... 7772/80

[51] Int. Cl.$^3$ ............................ C09B 1/54; D06P 1/20
[52] U.S. Cl. ............................................ 8/471; 8/678; 8/922; 8/924; 260/380; 428/207
[58] Field of Search .................... 8/471, 678; 260/380; 428/207

[56] References Cited

U.S. PATENT DOCUMENTS 2,466,008 4/1949 Dickey ................................ 260/380
2,466,009 4/1949 Dickey ................................ 260/380
4,278,434 7/1981 Krock et al. ............................ 8/471

FOREIGN PATENT DOCUMENTS 1195151 6/1970 United Kingdom .

*Primary Examiner*—A. Lionel Clingman
*Attorney, Agent, or Firm*—Wenderoth, Lind & Ponack

[57] ABSTRACT

The invention relates to transfer printing supports printed with a design which vaporizes in the temperature range from 180° to 210° C., and also to a process for printing synthetic planar textiles using such supports. The transfer printing supports contain, as red component, a 1-amino-4-hydroxyanthraquinone or -4-aminoanthraquinone compound which does not contain sulfo and carboxyl groups and which carries in the 2-position of the anthraquinone nucleus an alkoxy group which contains at least one fluorine atom and preferably at least three fluorine atoms.

9 Claims, No Drawings

TRANSFER PRINTING SUPPORTS AND DYES FOR THEIR MANUFACTURE: FLUOROALKOXY ANTHRAQUINONE DYE

The present invention relates to novel transfer printing supports, in particular paper supports, which are used for printing synthetic fibres, especially polyester and polyamide fibres, by heat transfer printing.

The very widely employed transfer printing process for printing polyester fabrics dry at 200° to 210° C. by bringing them into contact with a support carrying the design to be transferred, e.g. by the process described in French patent specification No. 1 585 119, has also proved successful for printing tightly packed fabrics such as polyamide carpets. For this utility there are used supports printed with so-called "penetrating" dyes. Such supports are described e.g. in U.S. Pat. No. 4,088,442 and in the corresponding French patent specification No. 2 262 601. The prints obtained with the supports printed with the known penetrating dyes are unsatisfactory in the red range both as regards shade and also lightfastness. These faults of the known technology are eliminated by the novel transfer printing supports of the present invention.

The novel transfer printing supports of this invention consist of a flexible, heat-stable support, e.g. a paper web, which is printed with a design which vaporises, i.e. sublimes, in the temperature range from 180° to 210° C., and which contains, as red component, a 1-amino-4-hydroxyanthraquinone or -4-aminoanthraquinone compound which does not contain sulfo and carboxyl groups and which carries in the 2-position a fluorinated alkoxy group. Particularly useful transfer printing supports of this kind are those which carry a dye of the formula

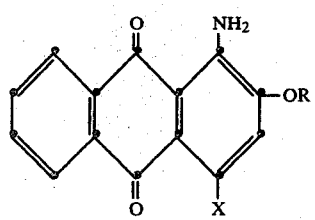

wherein X is a free amino or, preferably, hydroxyl group, and R is a low molecular alkyl group containing at least one fluorine atom and preferably at least three fluorine atoms.

The invention also relates to a process for printing textile planar substrates of synthetic or partly synthetic polymeric materials by transfer printing, which process comprises using a support which is printed with a design which vaporises at 180° to 210° C. and the red component of which is a 1-amino-4-hydroxyanthraquinone- or 4-aminoanthraquinone compound of the above defined kind.

Other objects of the invention are printing inks and pastes for transfer printing and the substrates, in particular polyester and polyamide woven, knitted or velvet pile fabrics as well as more or less high-pile plush fabric and high-warp carpets and, in particular, polyamide or polyester carpets which have been printed with the transfer printing supports of this invention, i.e. which contain a red component of the specified kind.

The transfer printing process is generally known (cf. e.g. Colour Index, 3rd Edition, Vol. 2, page 2480) and is described in detail in French patent specification Nos. 1 223 330, 1 334 829 and 1 585 119. The process comprises contacting supports which are printed with suitable inks with the substrate to be printed, whereupon dye is vaporised and transferred by sublimation from the support to the substrate under the action of heat and/or pressure. It is not necessary to effect transfer under reduced pressure, e.g. at 80 to 110 mbar, with the supports of this invention. It is possible to print also tightly packed materials under normal pressure with excellent penetration of dye, especially of dyes in which X is a hydroxyl group.

Suitable supports are planar structures such as paper, cellophane, cotton fabric, linen fabric, metal sheets etc. The preferred support is paper.

The printing inks can be applied to the supports by conventional methods. The composition of the printing inks depends, inter alia, on the nature of the substrate, of the printing method, and of the support.

Particularly suitable printing methods for the production of printed paper supports are rotogravure and rotary screen printing.

Suitable substrates are preferably planar structures such as non-woven fleeces, felts, skins, sheets and, in particular, synthetic woven and knitted fabrics, especially those made from polyesters such as polyethylene terephthalate, and from polyamides such as polyhexamethylene adipamide, and from polyamides from ε-caprolactam.

The starting dyes are obtained in a manner known per se, e.g. by alkylation of 4-aminoxanthopurine with a dialkyl sulfate which contains at least one fluorine atom and preferably at least three fluorine atoms in the alkyl moieties.

A further method of obtaining the novel dyes of this invention consists in transetherifying corresponding 2-phenoxy derivatives. Accordingly, the dyes of the present invention of the formula indicated above can be obtained by reacting the 1-amino-4-hydroxy-2-phenoxyanthraquinones and the 1,4-diamino-2-phenoxyanthraquinones with aliphatic alcohols containing at least one fluorine atom and preferably at least three fluorine atoms. This reaction is conducted with advantage in the presence of an alkali, e.g. sodium, potassium or lithium hydroxide, or of calcium hydroxide.

It is also possible to obtain the dyes of this invention from the corresponding 2-haloanthraquinones, by reacting 1-amino-2-chloro-(or -2-bromo)-4-aminoanthraquinone or -4-hydroxyanthraquinone with an aliphatic alcohol which contains at least one fluorine atom and preferably at least three fluorine atoms, e.g. with 2,2,2-trifluorethan-1-ol. This reaction of 2-haloanthraquinones with fluorine-containing alcohols is advantageously carried out in the presence of small amounts of a phenol or naphthol as catalyst.

The resultant dyes, whose sublimation characteristics, penetration and lightfastness are remarkable, are novel compounds which also constitute an object of the invention.

The novel dyes have excellent compatibility with the high-penetration dyes conventionally employed in transfer printing, as they have virtually the same, or at least very similar, transfer curves in the range from 175° to 205° C.

The supports containing these dyes produce on polyester and polyamide fabrics printed by the heat transfer printing method, fast red prints of excellent lightfastness and penetration. They can therefore be used for printing carpets, in particular polyamide carpets having a pile height from 0.9 to several millimeters, by transfer in the vapour phase. The lightfastness of such prints, especially on polyamide fibres, is substantially better than that of transfer prints obtained with hitherto known supports.

The invention is illustrated by the following Examples, in which parts and percentage are by weight, unless otherwise indicated.

EXAMPLE 1

35 parts of 1-amino-4-hydroxyanthraquinone which carries a $\beta,\beta,\beta$-trifluoroethoxy group in the 2-position, are mixed with 50 parts of a dispersant (lignin sulfonate or a condensation product of naphthalenesulfonic acid and formaldehyde) and 100 parts by volume of water, and the mixture is converted into a dispersion by grinding for 10 hours in a ball mill. The resultant dispersion, containing about 30% of dye, is made into a paste with 400 parts of a 10% carob seed gum ether thickener and 500 parts by volume of water. Paper is printed with this transfer paste by rotary screen or rotogravure printing. The printed paper is then pressed for 60 seconds at 200° C. with a 2 mm high polyamide carpet or nonwoven fleece to give a strong red print of excellent lightfastness and penetration.

EXAMPLE 2

50 parts of 1-amino-2-trifluoroethyloxy-4-hydroxyanthraquinone are made into a paste with 5 to 10 parts of an emulsifier mixture of ethoxylated nonyl phenol (4 to 12 moles of ethylene oxide) in water. 50 parts of ethyl cellulose N4 (Hercules Powder) are added and the mixture is kneaded for 2 hours and then ground in a conventional mill. The dyestuff powder so obtained is stirred into a mixture of 730 g of ethanol, 50 g of ethylene glycol and 20 g of ethyl cellulose N 22 (Hercules Powder). The resultant transfer ink can be printed on to paper by rotogravure printing. Using these printed papers, fast red prints of excellent lightfastness and penetration can be obtained on polyamide needle felt carpets by transfer printing at 205° C. for 60 seconds.

By following the procedure of one of the preceding Examples using both 1,4-diisopropylaminoanthraquinone and 1-amino-trifluoroethoxy-4-hydroxyanthraquinone, it is possible to obtain transfer printing supports with which violet prints of better lightfastness on polyamide carpets at 205° C. can be obtained than by using known supports printed with 1-amino-2-bromo-4-hydroxyanthraquinone. Pure and lightfast orange prints are obtained by using supports obtained in one of the preceding Examples printed with a mixture of 1-amino-2-trifluoroethoxy-4-hydroxyanthraquinone and the dye of the formula

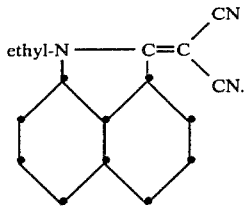

EXAMPLE 3

Production of 1-amino-2-(2',2',2'-trifluoroethoxy)-4-hydroxyanthraquinone

A mixture of 75 parts by volume of 2,2,2-trifluoroethanol and 5.4 parts of KOH is stirred for 1 hour at 125° C. The mixture is cooled to room temperature and then 22.5 parts of 1-amino-2-phenoxy-4-hydroxyanthraquinone are added. The mixture is stirred for 14 hours at 125° C. and then cooled again to room temperature. A solution of 8.25 parts of sodium bicarbonate in 69 parts by volume of water is added to the dyestuff suspension, which is then stirred for ½ hour and filtered. The residue is washed with 80 parts by volume of ethanol and the filter cake is then well stirred in water. After filtration, the filter cake is washed with water until free of salt and dried in a vacuum cabinet at 80° C., affording 22.1 parts of a reddish brown powder with a melting point of 266°–268° C.

EXAMPLE 4

Production of 1,4-diamino-2-(2',2',2'-trifluoroethoxy)-anthraquinone 1.65 parts of 1,4-diamino-2-chloroanthraquinone and 0.45 part of potassium hydroxide are heated in 30 parts by volume of 2,2,2-trifluoroethanol for 20 hours to 180° C. The mixture is then cooled to room temperature. The resultant violet suspension is filtered and the filter cake is washed with a small amount of trifluoroethanol. To remove inorganic salts the residue is stirred in hot water, filtered, and the filter cake is washed with hot water until free of salt, then dried at 80° C. in a vacuum cabinet to give 1.75 parts of a black crystalline powder with a melting point of 180°–182° C. This product still contains a trace of starting material, which can be easily removed by recrystallisation from toluene. The melting point of the pure product is 189°–191° C. Synthetic fibres such as polyester, polyamide or polyacrylonitrile, can be printed in a strong bluish red shade with this dye by transfer printing.

What is claimed is:

1. A transfer printing support printed with a design which vaporises in the temperature range from 180° to 210° C. and containing, as red component, a 1-amino-4-hydroxyanthraquinone or 1-amino-4-amino-anthraquinone compound which does not contain sulfo or carboxyl groups and which carries the 2,2,2-trifluoroethoxy group in the 2-position of the anthraquinone nucleus.

2. A transfer printing support according to claim 1 wherein the red component is a dye of the formula

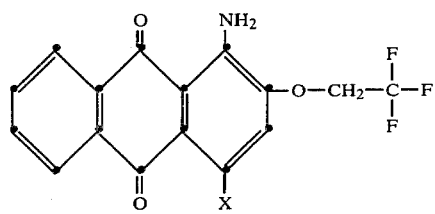

wherein X is amino or hydroxyl.

3. In a process for printing textile planar fabrics made from polyester or polyamide, by dry transfer printing, the improvement wherein there is employed a support as defined in claim 1.

4. A process according to claim 3 which comprises printing polyamide carpets under atmospheric pressure at 190° to 210° for at least 40 seconds.

5. Polyester or polyamide fabric printed by a process as claimed in claim 3.

6. A polyamide carpet printed by a process as defined in claim 4.

7. A 1-amino-4-hydroxyanthraquinone or 1-amino-4-aminoanthraquinone which does not contain sulfo and carboxyl groups and which carries in the 2-position of the anthraquinone nucleus the 2,2,2-trifluoroethoxy group.

8. An anthraquinone dye of the formula

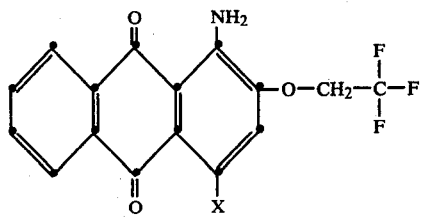

wherein X is amino or hydroxyl.

9. A process for the production of an anthraquinone dye, which comprises reacting a 1-aminoanthraquinone which does not contain sulfo and carboxyl groups and which carries in the 4-position a free amino or hydroxyl group and in the 2-position a halogen atom or an aryloxy group, with 2,2,2-trifluoroethan-1-ol.

* * * * *